United States Patent
Fernandez

(10) Patent No.: US 8,168,846 B2
(45) Date of Patent: May 1, 2012

(54) PROCESS AND PLANT FOR CONVERTING HAZARDOUS WASTE CONTAINING CHROMIUM VI INTO NON-HAZARDOUS WASTE

(75) Inventor: Francisco Garcia Fernandez, Guanajuato (MX)

(73) Assignee: Cromotecnica Mexico, Guanahuato (MM)

( * ) Notice: Subject to any disclaimer, the term of this patent is extended or adjusted under 35 U.S.C. 154(b) by 1023 days.

(21) Appl. No.: 11/883,868

(22) PCT Filed: Feb. 7, 2006

(86) PCT No.: PCT/MX2006/000008
§ 371 (c)(1), (2), (4) Date: May 13, 2008

(87) PCT Pub. No.: WO2006/085736
PCT Pub. Date: Aug. 17, 2006

(65) Prior Publication Data
US 2008/0293559 A1    Nov. 27, 2008

(30) Foreign Application Priority Data

Feb. 8, 2005 (MX) .................... PA/A/2005/001525

(51) Int. Cl.
| | |
|---|---|
| *A62D 3/37* | (2007.01) |
| *A62D 3/30* | (2007.01) |
| *C01G 37/00* | (2006.01) |
| *C01G 39/00* | (2006.01) |
| *C01G 41/00* | (2006.01) |
| *C22B 34/30* | (2006.01) |
| *B09C 1/08* | (2006.01) |
| *B09C 1/10* | (2006.01) |
| *B09C 1/02* | (2006.01) |
| *C02F 1/00* | (2006.01) |

(52) U.S. Cl. ........ 588/319; 568/313; 568/407; 568/400; 423/53; 405/128.5; 405/128.7; 210/739

(58) Field of Classification Search .......... 210/662–743; 405/128.5, 128.8, 128.75; 423/53–55; 588/313–321, 400, 405, 412, 256
See application file for complete search history.

(56) References Cited

U.S. PATENT DOCUMENTS 5,304,710 A * 4/1994 Kigel et al. .................... 588/319
(Continued)

FOREIGN PATENT DOCUMENTS

DE    19546644 A1    6/1996
(Continued)

OTHER PUBLICATIONS

Written Opinion for Application No. PCT/MX2006/000008, dated Oct. 6, 2006.
(Continued)

*Primary Examiner* — Jerry Lorengo
*Assistant Examiner* — Jennifer Smith
(74) *Attorney, Agent, or Firm* — Nelson Mullins Riley & Scarborough LLP; Jeanne M DiGiorgio, Esq.; Jill Gorny Sloper, Esq.

(57) ABSTRACT

The instant invention relates to a process and plant for the transformation of dangerous wastes containing chromium six as contaminant into non dangerous wastes that can be stored without special care and will be degraded in the environment without time limit. The process basically consists of milling, extracting chromium six in liquid phase and under controlled conditions of stirring, time and temperature, proceeding then, through reduction, to transform the chromium six in chromium three and then precipitating as chromium trioxide, through gasification.

The solid resulting from the transformation process can be used as raw material for the manufacturing of firebricks or eventually for the manufacturing of bricks used in the building industry through a process not included in the instant description.

8 Claims, 1 Drawing Sheet

U.S. PATENT DOCUMENTS

| | | | | |
|---|---|---|---|---|
| 5,370,801 A | * | 12/1994 | Sorensen et al. | 210/742 |
| 5,389,262 A | * | 2/1995 | Guess | 210/719 |
| 5,951,457 A | | 9/1999 | James | |
| 6,416,251 B1 | * | 7/2002 | Nayak et al. | 405/128.8 |
| 6,955,501 B2 | * | 10/2005 | Yen | 405/128.75 |
| 2008/0293559 A1 | * | 11/2008 | Fernandez | 501/132 |

FOREIGN PATENT DOCUMENTS

| | | |
|---|---|---|
| WO | WO-93/14232 A1 | 7/1993 |

OTHER PUBLICATIONS

International Preliminary Report on Patentability for Application No. PCT/MX2006/000008, dated Mar. 1, 2007.

International Search Report for Application No. PCT/MX2006/000008, dated Oct. 6, 2006.

* cited by examiner

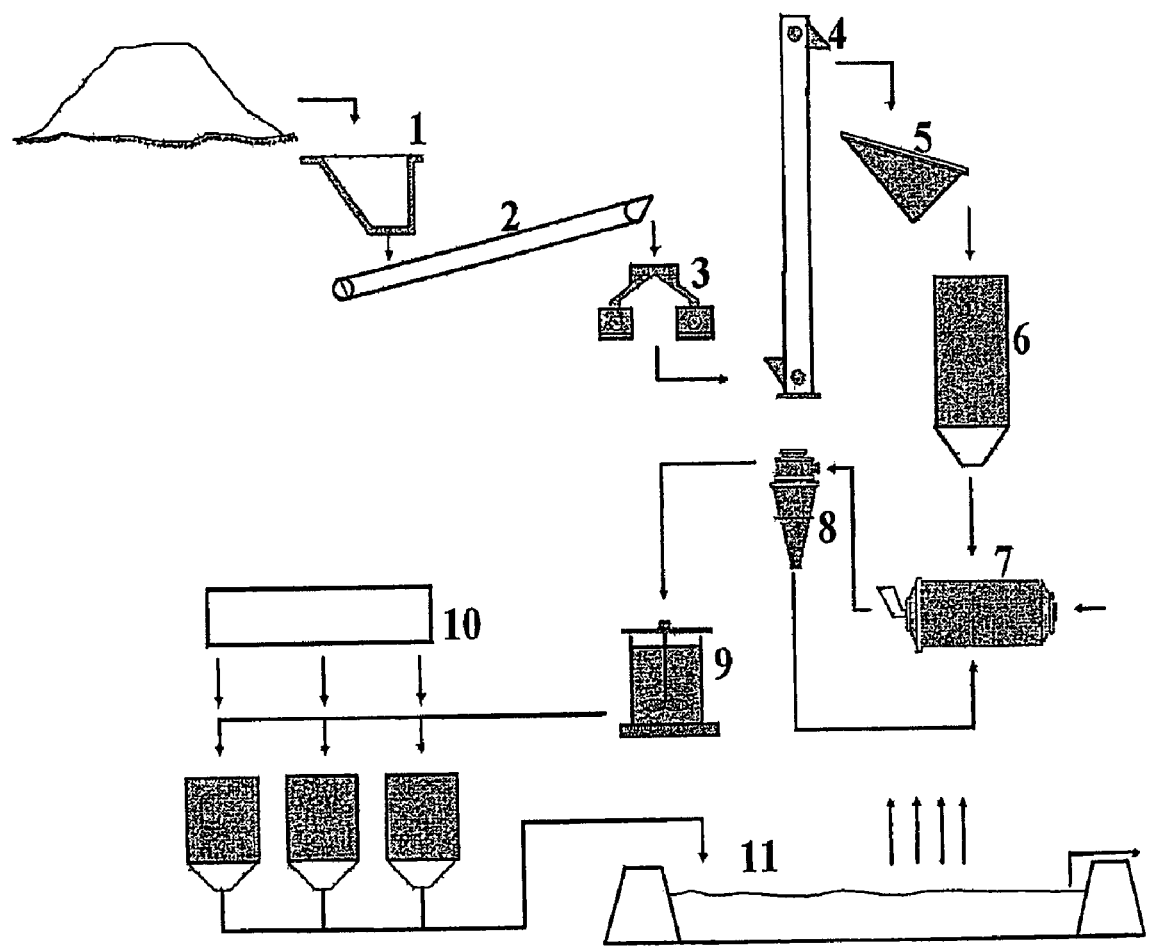

PROCESS AND PLANT FOR CONVERTING HAZARDOUS WASTE CONTAINING CHROMIUM VI INTO NON-HAZARDOUS WASTE

The instant invention relates to the industrial processes of lixiviation of chemical compounds and mineral derivatives of toxic wastes and their further treatment for the transformation of dangerous wastes containing chromium six into non dangerous and non contaminant wastes and/or used for the manufacturing of building items. The invention also relates to the mining field and to the waste of industrial products of high economic value derived from the processes inherent to metallurgy.

BACKGROUND OF THE INVENTION

The instant invention relates to a new process and the corresponding plant for the transformation of dangerous waste containing chromium six ($CR^{+6}$) into non dangerous wastes that meet the requirement of the CRETIB analysis.

The process includes the following steps: milling, water suspension, partial recovery of the chromium six, chemical treatment for the reduction of all the chromium six into chromium three through the action of a mixture of sulfurous anhydride gas with residual sulfuric acid from the manufacturing of liquid vaselines, basification. Finally, the resulting product, once meeting the requirements of the CRETIB analysis, can be used as raw material for the manufacturing of firebricks or for storage without any special requirement because it is now a non dangerous waste.

The abovementioned dangerous wastes are generated mainly in the preparation of sodium bichromate through alkaline fusion of chromium mineral under an oxidizing atmosphere in several types of furnaces depending on the process used, extracting in a second step, through lixiviation, a sodium chromate solution which is then transformed through acidification into sodium bichromate, obtaining as sub-products alumina or aluminum hydroxide contaminated with variable amounts of chromium six that, together with the final residues of the lixiviation are dangerous wastes. It is possible to recrystallize the sodium sulfate to purify it, to be used as raw material in the paper industry or in several chemical processes.

As mentioned above, the contaminated alumina and the lixiviation residue constitute dangerous wastes.

The lixiviation residue is constituted by insoluble chromates, iron salts, complex silicates including chromium in their composition, as well as chromium salts encapsulated by the silicates and insoluble salts. This makes their reduction and/or extraction difficult, and thus the instant invention is focused onto the elimination of said barriers and to obtain 100% efficacy in the reduction processes, verified for the fulfillment of the requirements of the CRETIB analysis.

Hereinafter the documents of the state of the art related to the instant invention are presented in order to be included as references.

MX Patent Application No. 9300307 filed on Jan. 21, 1993 by Luigi Stoppani S. P. A. presents background information related to the art to which the instant invention belongs. The mentioned MX Patent Application presents a treatment at 450 Celsius degrees under a sulfur atmosphere with low oxygen contents, in a tubular furnace closed at its ends and with indirect heating. The advantage of the instant invention is that it does not require the use of a complicated installation and process as described in the abovementioned patent application. As mentioned above, prior milling and water suspension, a reducing mixture of sulfurous anhydride and sulfuric acid waste from vaseline manufacturing is used in reactors equipped with stirring devices without the need to heat or isolate the system from the atmosphere. It does not exert an influence on the reaction; it is a batch process, but presenting a continuous flow because at least three reactors are used sequentially. The total reduction is ensured through the criteria of CRETIB analysis, the resulting material is usable in the manufacture of bricks or firebricks and thus the natural mineral resources are used to their fullest extent. The process described in the instant invention and Stoppani's process are two very different processes. Stoppani's process is conducted in a closed furnace through solid-gas reaction, wherein the control of the reaction and its efficacy are not divulged clearly and cannot be precisely grasped from the wording of the patent document. In the process of the instant invention, the reaction is conducted in a liquid medium in a reactor, wherein extraction of the chromium to be reduced is conducted first and then the steps of chemical reaction, acidification and further reduction in a perfectly homogeneous phase are carried out, the complete stabilization being verifiable through the CRETIB analysis, which is not the case of the Stoppani's process. Moreover, in the process of the instant invention, the efficacy control is perfectly traceable and verifiable at any time during the process.

The object of the instant invention is to obtain the protection justified and validated by the detailed description mentioned hereinafter and by the technical-scientific development invested in the research exposed in the examples described, and against a possible protection granted to third parties, because the previously mentioned state of the art does not totally eliminate chromium six and confines it as a dangerous waste.

OBJECTS AND ADVANTAGES OF THE INVENTION

Generally, and based on the background previously described with regard to the processes for the transformation of dangerous waste containing chromium six into non dangerous waste, it can be interpreted that as of now there is no highly efficacious processes for the long term elimination of dangerous wastes. In this context, the justification of the present need to develop new technologies or processes for the transformation of said wastes is obvious. Therefore, the instant invention has the following objects.

The main object of the instant invention relates to a process and the corresponding plant for the extraction and reduction of chromium six compounds present in dangerous wastes, under the forms of low solubility chromium compounds or chromium compounds encapsulated within insoluble compounds.

Moreover, another object of the instant invention is to disclose the transformation process of dangerous wastes, starting with the steps of milling, washing, water suspension, treatment with a residual sulfuric acid mixture from liquid vaseline manufacturing and sulfurous anhydride, once the total reduction is obtained, it is basified at a pH 8-8.5.

Finally, another object of the instant invention is to use the material resulting from the process of the invention to manufacture bricks and firebricks, because it does not constitute a dangerous waste.

Thus, in the instant invention, a process is presented for the transformation of dangerous wastes containing chromium six into non dangerous wastes.

BRIEF DESCRIPTION OF THE FIGURES

Other characteristics and advantages of the instant invention will be obvious from the following detailed description of the objectives and preferred embodiments, the enclosed claims and the accompanying figure wherein:

FIG. 1 shows a process flow chart and plant for the transformation of dangerous wastes containing chromium six into non dangerous wastes according to the instant invention.

DETAILED DESCRIPTION OF THE INVENTION

The process object of the instant invention includes the steps of: a) transportation of the dangerous wastes containing chromium six to be treated to the Process Plant, being the first operation unitary; b) a first milling through a jaw crusher, to reduce the largest blocks formed during the storage of the wastes into particles with a diameter no larger than one inch, to complete then with c) a second milling in a ball mill, to obtain a powder having such a granulometry that 80% of it passes through a sieve mesh 200; afterwards d) a first wash is conducted with water to extract chromium six in liquid phase and its soluble salts, the resulting diluted solution is sent to the process of sodium bichromate obtainment as process waters; e) the milled material meeting the specified granulometry and having been submitted to a first wash, is unloaded onto a conveyor belt that transfers it to a silo feeding the reactors where the complete reduction of the chromium six remaining after the first wash is conducted.

As commented, the twenty-thousand liter stainless steel reactors are fed with the same mass of water as the mass of the waste to be loaded; f) adding the waste from the feeding silo, under constant stirring; g) adding gradually the residual sulfuric acid from liquid vaseline manufacturing, because the neutralization and reduction process is highly exothermic; h) keeping the temperature below 80° C., the amount of residual sulfuric acid is dosed in; i) controlling the suspension pH till it reaches a value of 2.5+/−0.5; j) shaking during half an hour, then a gas stream of reducing agent is injected through the lower part, with continuous stirring depending on the time and the amount to be injected of the percentage present as chromium six; and k) determining the chromium six value, said value shall be zero and then it is basified till a pH of 8-8.5; a new sample is then extracted and submitted to the analysis called CRETIB. (Corrosive, reactive, explosive, toxic, inflammable, biologically infectious).

Fulfilling the criteria of the mentioned CRETIB analysis, it is unloaded to separate the process water from the non dangerous waste obtained. This operation can be conducted through simple decantation in storage cells or using filters the design and capacity of which depend on the volumes to be processed on a daily basis.

The material obtained, as already specified, is adequate to be used as raw material for the manufacturing of bricks and/or firebricks. The feasibility of said use was shown through several experiments, studies and applications.

In the description of the flow chart of FIG. 1, the dangerous waste containing chromium six is conveyed to the receiving hopper (1) that feeds the conveyor belt (2) that takes the material to the hammer crusher (3); there, said hammer crusher reduces the granulometry to blocks of one-inch diameter at most; then, the material is sent through the bucket elevator (4) to the vibrating sieve (5) feeding the storage silo (6); said silo, in turn, feeds the ball mill (7), where wet milling is conducted so that 80% passes through a mesh 200 sieve; the material is classified in the cyclone (8), the finest material passes to the tank (9) equipped with a stirring device, where the suspension of the material is conducted in 50% water; the coarsest material separated in the cyclone returns to the ball mill of the tank (9) equipped with a stirring device, the suspension is transferred to the reaction reactors (10), where it is acidified with residual sulfuric acid or 98% sulfuric acid till the pH is lowered to 2.5-3, a gas stream of reducing agent is injected keeping the temperature at 80° C. through continuous stirring during four hours, a sample is taken and chrome six concentration is determined through spectrophotometry, said concentration has to be below 0.5 ppm; the pH is modified again to 8.8-9, another sample is taken for final CRETIB analysis, it is unloaded to the evaporation pit (11) and final disposal for the manufacturing of bricks and firebricks.

The instant invention relates to a novel process for the transformation of dangerous wastes containing chromium six as contaminant into non dangerous wastes that can be stored without any special care and can be degraded in the environment without time limit.

The process basically includes milling, chromium six extraction in liquid phase and under controlled conditions of stirring, time and temperature, to then proceed, through reduction, to transform chromium six into chromium three and further precipitation as chromium trioxide, through basification.

The solid resulting for the transformation process can be used as raw material for the manufacturing of firebricks or eventually for the manufacturing of bricks used in the building industry through a process not included in the present description. Moreover, the present invention offers a novel process because of the efficacy reached through its application, since a dangerous waste with variable chromium-six content is transformed into a non dangerous waste upon eliminating the chromium-six content till said waste meets the values set by the environment legislations. Said process is different from the processes normally used in the industry where the presence of chromium six is reduced through different techniques, but still remains in the classification of dangerous waste that must be stored under very strict conditions of insulation and control with the possibility of long term filtration because no one can ensure the safety and the absence of accidental contamination during a period of time exceeding one hundred years. The final product obtained through the process object of the instant invention does not present any possibility of contamination currently or in the long term because it is not a dangerous material any more.

The process of the instant invention starts with a two-stage milling, first through a jaw crusher that reduces the size of the waste to one-inch particles maximum, it then passes through a conveyor belt to a ball mill that reduces the granulometry so that 80% of the waste passes through a mesh 200 sieve.

Through a bucket elevator, it is taken to a milled material storage silo from which the reaction reactors are fed, in said reaction reactors a 50% water suspension is produced, then diluted sulfuric acid is gradually added, said diluted sulfuric acid can be the residue of another industrial process till the pH of the suspension is reduced to 2.5-3, the neutralization reaction is exothermic and has to be controlled at 80° C. and has to be kept at this value with continuous stirring during four hours, and under optimum temperature and residence time according to the timely drawn graphs of temperature efficiency versus time.

After the set reaction times have elapsed, a representative sample of the suspension is taken and the CRETIB analysis additionally described is conducted. If the chromium-six concentration present is lower than 0.5 ppm, pumping is conducted to the tailings dam where the process solution is separated from the solid material that can be stored in the tailings dam through the cells procedure. Said cells are closed once they are filled and covered with mud. Autochthonous flowers are then planted or also, optionally, the solid obtained can be used as raw material for the manufacturing of firebricks or building bricks.

The above description and the following examples are offered to illustrate particular embodiments of the invention and shall no be considered as limiting the protection scope of said invention.

EXAMPLES

The process is used for the reduction of the chromium-six content of the wastes from sodium bichoromate manufacturing.

Sodium bichromate manufacturing is conducted through an alkaline fusion at 1200° C. under an oxidizing atmosphere in a rotary furnace with a controlled residence time, then the sodium chromate formed is extracted through water lixiviation, said solution is submitted to concentration, pH reduction and purification to finally obtain the sodium bichromate in solution or crystals.

After the lixiviation step, a mixture of salts and iron, calcium, sodium and chromium six silicates remains as a dangerous waste in percentages that vary depending on the characteristics of the applied process, but generally higher than 2%, being 0.5 ppm the limit to be considered a non dangerous waste.

All the companies apply a primary process that reduces the chromium six content, but above the 0.5 ppm limit. In our case, the novelty is that, once treated, the residue meets the maximum 0.5 ppm chromium six limit, and this is verified through a CRETIB analysis. The result is a non dangerous waste which can be stored under normal conditions, without the need of special care because the chromium content has returned to its natural state, i.e. chromium three.

Stabilization Process

The process begins with the milling of the waste to facilitate the complete reduction reaction, because the chromium is encapsulated within complex silicates that impede a complete stabilization of the chromium six present. Said step is essential for the fulfillment of the characteristics of a non dangerous waste.

After the milling, the waste is suspended in water and treated with sulfuric acid to reduce the pH to 2-2.5, condition necessary for chromium-six reduction. All this is conducted under conditions of controlled temperature.

Then the reducing agent, a sulfurous anhydride gas stream, is injected, also under conditions of controlled temperature and stirring, the CRETIB analysis is conducted and if the criteria are met, the waste is sent to the definitive storage area.

For the abovementioned process, a plant has been designed that was also approved and authorized by the National Institute of Ecology together with the process.

CRETIB Analysis

The name of said analysis means that, in order not to be considered dangerous, a waste must not be corrosive, reactive, explosive, toxic, inflammable and biologically infectious.

The specific procedure of the instant invention to which the waste is submitted consists of taking a representative sample, dividing it into four parts, placing it in an equipment consisting of four closed 500 millimeter pipes, with water, and submitting the test tubes to an oscillatory movement during 24 hours in order to extract all the soluble chromium. Its concentration is then determined through spectrophotometry and it should not be above 0.5 ppm.

Example of Operation

The waste is milled till 80% passes through a 200 mesh, a rector is loaded with 5,000 Kg on the same quantity of water, sulfuric acid is added till the suspension reaches a stable pH 2.5-3, a reducing agent selected from the group consisting of ferrous salts and sulfurous anhydride is added or, if not available, sulfurous anhydride, stirring during four hours and maintaining a 80° C. temperature is originally obtained without heating because the dilution of sulfuric acid in water is conducted through an exothermic reaction.

After a period of time of four hours, a sample is taken, the chromium six concentration in the solution is determined, and if it is below 0.5 ppm, the pH is raised with a sodium hydroxide solution till a pH value of 8.5-9 is obtained in order to precipitate all the chromium six salts formed as insoluble chromium trioxide. At this time, the suspension is pumped to a tailings dam storage area where the separation of the solid from the supernatant liquid is conducted. Said supernatant liquid returns to the process to be used again as extraction liquid mixing it mixing it with an equal part of fresh water.

Plant Description

The plant for the processing of the dangerous waste containing chromium consists of the following areas:

Milling

FIRST: The material is transported by means of dump trucks till the area of inlet to the process, i.e. the milling area. A vibratory hopper is fed that feeds a jaw crusher that reduces the granulometry of the wastes to pieces no larger than one inch.

SECOND: The material coming from the crusher is fed to a conveyor belt that takes it to the second milling stage, a ball mill that reduces the granulometry so that 80% of it passes through a 200 mesh sieve, in order to expose all the chromium six derivatives to the extraction and reduction process.

THIRD: The milled material is sent to a storage silo by means of a bucket elevator.

The whole milling stage is equipped with dust aspiration devices and cyclones, as well as sack filters for emission control purposes.

Chemical Reaction

Three stainless steel reactors were used, 20,000 liter capacity each, equipped with stirring devices, steam jacket heating, gas extraction and washing, injection pipe for sulfurous anhydride gas stream, temperature control, dosing pumps for adding diluted sulfuric acid and eventually the additional reducing agent used.

The operation of the reactors is in batches, but the three reactors work sequentially so that the process per se has a continuous character.

Raw Material Storage

The installation is equipped with:

FIRST: A carbon steel tank, minimum capacity 20,000 liters, for sulfuric acid storage.

SECOND: A carbon steel tank, minimum capacity 20,000 liters, for the alternative auxiliary reducing agent storage.

THIRD: A series of four 1000-Kg cylinders for liquid sulfurous anhydride and/or an adequate pipe connection to a plant generating continuously an 8% sulfurous anhydride stream in air.

Final Product Storage

The treated material or dangerous waste transformed into non dangerous waste is stored in a tailings dam-type deposit area where the separation of the solutions resulting from the process and the solid to be stored is effected, the size of said deposit area depends obviously on the mass to be treated. Modular cells can be built; once filled up to their maximum capacity, said cells are closed and covered with organic soil to sow autochthonous flora.

The whole plant, including the temporary storage zones or areas, shall meet the safety and ecological standards.

It will be obvious for the persons skilled in the art that other variations not specifically presented in the instant invention can be derived from the present detailed description and are considered within the scope of protection of this invention. Thus, the instant invention is not limited to the description of the specific embodiments illustrated, and the only limitation placed on the invention is stated in the following claims and their equivalent.

The invention claimed is:

1. A process for the transformation of dangerous waste material containing chromium six into non dangerous waste, characterized by the following steps:
   transporting the dangerous waste material containing chromium six to a reception hopper feeding a conveyor belt;
   taking the material to a hammer crusher that reduces a granulometry of the material to pieces having a maximum diameter of one inch;
   subsequently sending the material through a bucket elevator to a vibratory sieve that feeds a storage silo, wherein the storage silo feeds, in turn, a ball mill;
   conducting a wet milling process at the ball mill so that about 80% of the material passes through a mesh 200 sieve;
   classifying the material in a cyclone into fine material and coarse material, wherein
      the fine material passes to a stirring tank where the fine material is suspended in 50% of water to form a suspension, and the coarse material is separated in the cyclone and returns to the ball mill of the stirring tank;
   transferring the suspension to reaction reactors;
   acidifying the suspension with residual sulfuric acid or 98% sulfuric acid until the pH is lowered to a 2.5-3 value;
   injecting a gas stream of reducing agent to maintain the suspension at a temperature of 80° C. with continuous stirring for four hours;
   taking a sample to determine whether a chromium six concentration of the suspension is below 0.5 ppm according to a spectrophotometry determination, and if it is determined that the chromium six concentration is below 0.5 ppm:
   modifying the pH of the suspension to be 8.5-9,
   taking another sample for a final CRETIB analysis,
   discharging the suspension to an evaporation pit, and
   disposing of the suspension.

2. The process according to claim 1, wherein the dangerous waste is a product from the manufacturing of sodium bichromate.

3. The process according to claim 2, wherein the sodium bichromate is obtained through alkaline fusion at 1200° C. under an oxidizing atmosphere within a rotary furnace with a controlled residence time, and further comprising:
   extracting a sodium chromate solution through water lixiviation
   submitting said sodium chromate solution to concentration, pH reduction and purification processes to obtain the sodium bichromate in solution or crystals.

4. The process according to claim 3, wherein a dangerous waste comprising a mixture of iron, calcium, sodium and chromium six salts and silicates in percentages above 2% remains in the sodium chromate solution after the lixiviation.

5. The process according to claim 4, wherein after submitting the sodium chromate solution to the concentration, pH reduction, and purification processes, the waste includes less than 0.5 ppm chromium six.

6. The process according to claim 1, wherein during the wet milling process the chromium is encapsulated within complex silicates.

7. The process according to claim 1, wherein the reducing agent is ferrous salts or sulfurous anhydride.

8. The process according to claim 1, further comprising the steps of:
   taking a sample after a period of time of four hours;
   determining the concentration of chromium six;
   elevating the pH of the solution to 8.5-9 using a sodium hydroxide solution if said concentration is below 0.5 ppm, thereby precipitating the chromium three salts as insoluble chromium trioxide;
   pumping the solution to a tailings dam-type storage zone, wherein a solid phase is separated from a liquid supernatant; and
   returning said liquid supernatant to be used again as extraction liquid by mixing it with an equal part of fresh water.

* * * * *

UNITED STATES PATENT AND TRADEMARK OFFICE
CERTIFICATE OF CORRECTION

PATENT NO.        : 8,168,846 B2
APPLICATION NO.   : 11/883868
DATED             : May 1, 2012
INVENTOR(S)       : Francisco Garcia Fernandez It is certified that error appears in the above-identified patent and that said Letters Patent is hereby corrected as shown below:

On the cover page, item (73):

Change the Assignee information from "Cromotecnica Mexico, Guanahuato (MM)" to --Cromotecnica Mexico S.A. de C.V., Guanajuato (MX)--

Signed and Sealed this
Eighteenth Day of September, 2012

David J. Kappos
*Director of the United States Patent and Trademark Office*